Dec. 1, 1970  R. N. REKOW  3,543,536
OIL-FILLED TELESCOPING DRIVE LINE
Filed May 23, 1969  2 Sheets-Sheet 1
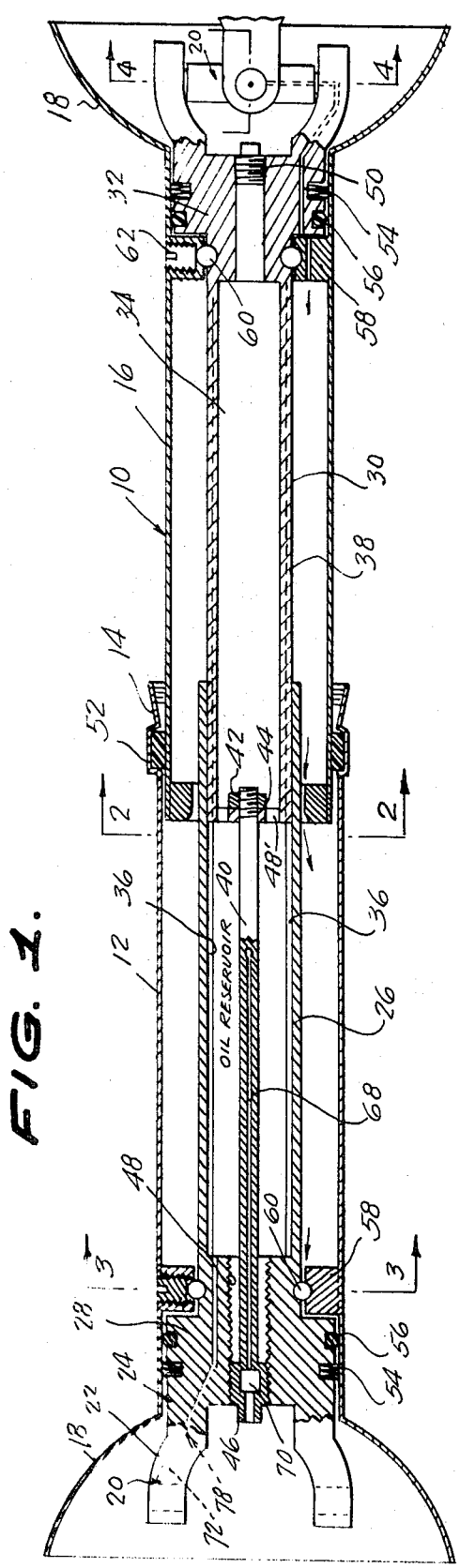
INVENTOR
RUSSELL N. REKOW,
BY
Berman, Davidson & Berman
ATTORNEYS.

Dec. 1, 1970 R. N. REKOW 3,543,536
OIL-FILLED TELESCOPING DRIVE LINE
Filed May 23, 1969 2 Sheets-Sheet 2

INVENTOR.
RUSSELL N. REKOW,
BY
Berman, Davidson & Berman
ATTORNEYS.

United States Patent Office 3,543,536
Patented Dec. 1, 1970

3,543,536
OIL-FILLED TELESCOPING DRIVE LINE
Russell N. Rekow, Rte. 2, Box 96N,
Emmett, Idaho 83617
Filed May 23, 1969, Ser. No. 827,417
Int. Cl. F16c *1/06;* F16d *3/06, 3/84*
U.S. Cl. 64—4                                                 6 Claims

ABSTRACT OF THE DISCLOSURE

An oil-filled telescoping drive line comprising a power shaft and a driven shaft with telescoping sleeve means disposed over the connecting portion of the power shaft and the driven shaft with the telescoping shaft means comprising at least two sleeves. The sleeves have their adjacent ends telescoped over each other with seal means therebetween and the sleeves are disposed on bearing means, so that the sleeves can rotate with respect to the power shaft and the driven shaft. The sleeves are provided with sealing means adjacent the ends thereof to prevent dirt from getting into the sleeves. The sleeves are further provided with oil means for providing lubrication of the inner parts disposed therein.

---

The present invention relates to shields for drive mechanisms and more particularly to such shields for exposed rotating drive mechanisms to protect the operator from injury during operation thereof.

It is an object of the present invention to provide rotating shields enclosing the power shaft and the driven shaft that is less expensive to produce and which further affords a better rolling action as the ball bearing means embodied in the structure are free to rotate independently in their enclosure.

It is another object of the present invention to provide shield means for the drive mechanism of a power shaft and a driven shaft provided with ball bearing means therein so that the rotating shields, besides retaining the rotating shields, will further take any heavy end thrust and carry a heavy load should the power shaft be subjected thereto.

It is still a further object of the present invention to provide a shield for drive mechanisms in which one shield is telescoped over another shield and sealing means are provided therebetween, and the opposite ends of the shields are provided with other sealing means including a convolute or bellows seal to prevent dust and oil from entering the shields and the oil from exiting therefrom.

Figure 4:
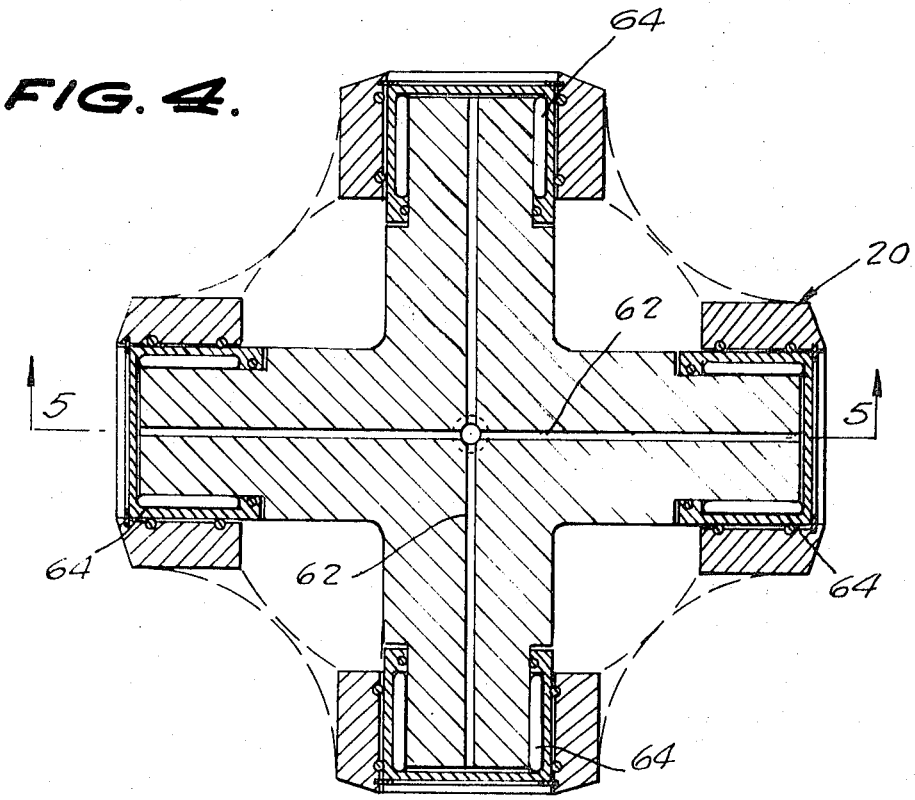
Figure 5:
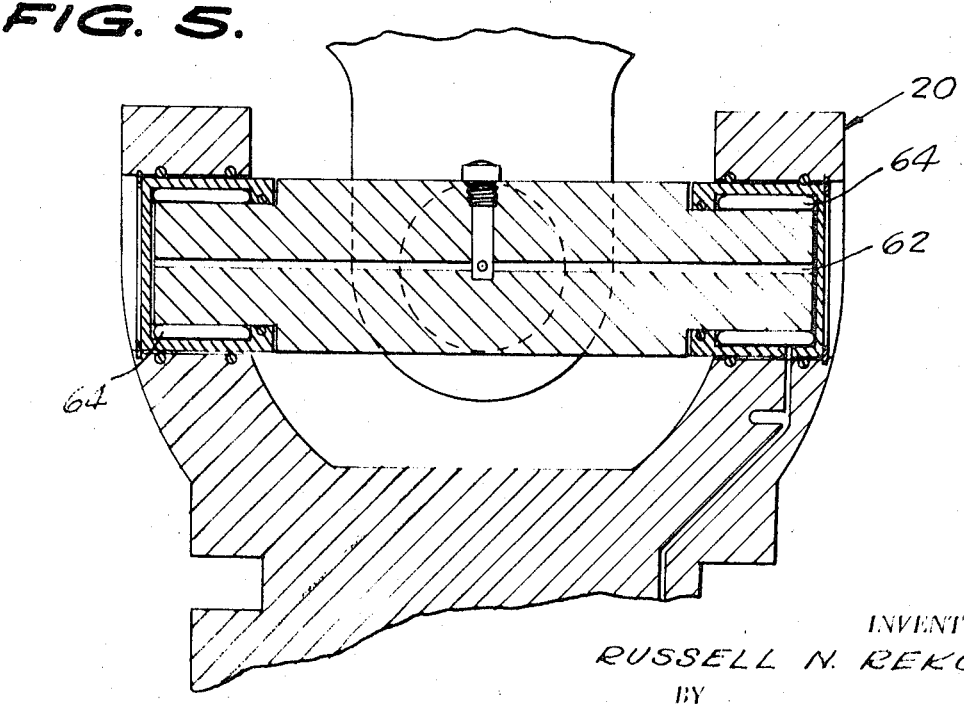

Various other objects and advantages of the present invention will be readily apaprent from the following detailed description when considered in connection with the accompanying drawings forming a part thereof, and in which:

FIG. 1 is a side view partly in section illustrating the oil-filled telescoping shield means of the present invention;

FIG. 2 is a section taken along the lines 2—2 of FIG. 1;
FIG. 3 is a section taken along the lines 3—3 of FIG. 1;
FIG. 4 is a section taken along the lines 4—4 of FIG. 1;
FIG. 5 is a section taken along the lines 5—5 of FIG. 4; and
FIG. 6 is a detailed view illustrating a method of supplying oil to the universal joint embodied in the present invention.

Referring to the drawings, the reference numeral 10 generally designates an oil-filled telescoping shield means embodying the present invention, comprising a hollow shield or sleeve 12 having its end 14 telescoped over an inner sleeve or shield 16.

The outer ends of the sleeves 12 and 16 are provided with hemispherical or flared sections 18 adapted to enclose the universal joint 20 of the driven shaft and the forked portion 22 of the power shaft 24.

The power shaft 24 is provided with a hollow section 26 and a solid section 28. The driven shaft 30 is provided with a solid section 32 and a hollow section 34. The hollow section 26 is provided with a plurality of inwardly extending splines 36 thereon adapted to engage with the corresponding or mating grooves 38 of the driven shaft 30.

As best seen in FIG. 1, the inner ends of the shafts are telescoped over each other and the power shaft 24 is provided with a central bolt member 40 extending therethrough with a nut 42 threaded on the end thereof to maintain the shaft together. The bolt member 40 extends through the washer member 44 of the driven shaft 30. The other end of the bolt member 40 is provided with a plug 46 that is threaded in a central threaded bore 48 of the power shaft. The washer 44 is provided with openings 48' therein.

The solid section 32 of the driven shaft 30 is provided with a threaded plug 50, which is removed for inserting the nut 42 in the hollow section 34 of the driven shaft to connect the power shaft and the driven shaft to one another.

It will be noted that the inner end 14 of the sleeve 12 is provided with an outwardly projecting circumferential recess 52 in which is disposed a ring or band of neoprene material which acts as a dust seal between the two ends of the telescoped sleeve.

The outer ends of the sleeves are provided with a pair of seals including a circular convolute or triple lip sealing member 54 that may be made of plastic material and inwardly thereof an O-ring seal 56, which seals 54 and 56 are disposed in annular recesses in the solid sections of the power shaft and the driven shaft.

The sleeves are further provided with inwardly extending ball bearing races 58 adapted to receive a plurality of ball bearings 60 therein. The ball bearings 60 are inserted within the interior of the race 58 by unthreading a plug 62 with an Allen wrench and inserting them into their race. It will be noted that the race is provided with a recess therein corresponding to a complementary recess in the adjacent portion of the solid section of the power shaft and the driven shaft, so that the ball bearings 60 will act as thrust bearings and properly maintain the sleeves and the shafts in position.

Oil is introduced into the interior of the hollow sections of the power shaft and the driven shaft for lubrication and oil is also introduced into the interior of the sleeves for lubricating of the ball bearings. The sealing members 54 and 56 and the neoprene seal in the recess 52 prevent the entry of dirt into the structure and prevent the leaking of any oil from the structure.

The universal joint 20 is provided with drilled lubricating or oil passages 62 therein in communication with needle bearings 64.

The U-joint 22 of the power shaft 24 is supplied with oil through a drilled passage 72 therein having a check valve 78 therein, as best seen in FIG. 6. Passage 72 communicates with the oil reservoir that surrounds the vent tube or bolt member 40, best shown in FIG. 1.

The bolt member 40 is provided with a drilled passage 68 therethrough and its outer end may be provided with a filter 70 for venting the interior of the power shaft and the driven shaft to the atmosphere.

From the foregoing description, it is apparent that the present invention provides a novel and economical oil-filled telescoping drive line which provides shield means for a power shaft and a driven shaft, such as one used in connection with agricultural implements and the like.

It is further apparent from the present invention that the sleeve or shield means of the present invention is provided with novel sealing means to prevent any dust or dirt from entering the interior of the structure and to prevent further any oil from leaking out of the structure.

The provision of the shield means and the ball bearing members on which the shield means rotate will prevent any injury from an operator of the machinery upon which it is disposed should he inadvertently fall against the connecting portions of the power shaft and the driven shaft, since the sleeves or shield means will rotate with respect to the moving parts of the power shaft and the driven shaft, and thus accidental contact with the shields or sleeves will cause no injury to the operator.

Further, the present invention provides a large bearing surface for positioning the shield means upon the power shaft and the driven shaft, and further provides ball bearing means associated therewith, so that the power shaft and the shield means and the driven shaft are maintained in proper position with respect to one another.

Inasmuch as it will be apparent that various changes may be made in the form, location and relative arrangement of several parts without departing from the essential characteristics of the invention, it is to be understood that this invention is not to be limited except by the scope of the appended claims.

What is claimed is:

1. In combination, a shaft assembly including a power shaft and a driven shaft, each of said shafts having a solid section and a hollow section with spline means on said power shaft and complementary grooved means on said driven shaft to receive said spline means, bolt means connecting said shafts axially together, and telescoping shield means enclosing the adjacent ends of said shafts including ball bearing means disposed between said shield means and power and driven shafts, and first and second sealing means adjacent the opposite ends of said shield means and central sealing means in said shield means and means for supplying oil to said shield means for said bearing means.

2. The combination of claim 1 wherein said shield means includes an outer sleeve with a circumferential recess therein, an inner sleeve having its end telescoped within said outer sleeve adjacent said recess, and a sealing ring disposed in said recess forming said central sealing means between said sleeves.

3. The combination of claim 2 wherein said power shaft and said driven shaft have longitudinal spaced circumferential recesses therein with a triple lip sealing ring and an O-ring seal in said recesses forming said first and second sealing means, said recesses being disposed adjacent the outer ends of said sleeves to provide a seal between said sleeves and the adjacent portion of said power and driven shafts.

4. The combination of claim 3 wherein said sleeves each have an inwardly depending ball bearing race adjacent its outer ends and said ball bearing means includes a plurality of ball bearings disposed in said races, and said power and driven shafts have circumferential recesses adjacent said races adapted to receive a portion of said ball bearings therein.

5. The combination of claim 4 wherein said power shaft has a threaded member extending therethrough and said driven shaft has a nut threaded on said threaded member to provide said bolt means.

6. The combination of claim 5 wherein said oil supply means includes a drilled passage in one of said shafts in communication with the interior of said sleeves.

References Cited

UNITED STATES PATENTS

| 1,541,007 | 6/1925 | Thiemer | 64—23 XR |
| 2,116,290 | 5/1938 | Spicer | 64—23 |
| 3,016,722 | 1/1962 | Batdorf | 64—23 |
| 3,242,695 | 3/1966 | Ross | 64—23 |
| 3,318,109 | 5/1967 | Ressler | 64—23 |

FOREIGN PATENTS 896,120  5/1962  Great Britain.

JAMES A. WONG, Primary Examiner

U.S. Cl. X.R.

64—23, 32